United States Patent
Diaz et al.

(10) Patent No.: US 8,608,254 B1
(45) Date of Patent: Dec. 17, 2013

(54) MOTOR SYSTEM FOR TRIGGERING BRAKE AND STEERING CONTROL DURING ENGINE FAILURE

(76) Inventors: Elido N. Diaz, Cape Coral, FL (US); Carmen Man, Cape Coral, FL (US)

( * ) Notice: Subject to any disclaimer, the term of this patent is extended or adjusted under 35 U.S.C. 154(b) by 417 days.

(21) Appl. No.: 12/977,806

(22) Filed: Dec. 23, 2010

(51) Int. Cl.
*B60T 13/00* (2006.01)

(52) U.S. Cl.
USPC .......... 303/6.01; 303/9; 303/10; 303/12; 180/406; 701/112

(58) Field of Classification Search
USPC .......... 303/6.01, 8, 9, 9.63, 9.66, 10, 11, 12, 303/20, 31; 180/271, 405, 406; 701/107, 701/112
See application file for complete search history.

(56) References Cited

U.S. PATENT DOCUMENTS

| | | | |
|---|---|---|---|
| 3,088,284 A | * | 5/1963 | Aaron ............................ 60/396 |
| 3,528,522 A | * | 9/1970 | Turke, Jr. ..................... 180/271 |
| 3,762,492 A | | 10/1973 | Ron |
| 3,820,620 A | | 6/1974 | Miller et al. |
| 3,847,243 A | | 11/1974 | Barth |
| 3,954,147 A | | 5/1976 | Hollins |
| 5,505,276 A | | 4/1996 | Luibrand |
| 5,507,360 A | * | 4/1996 | Simmons ..................... 180/406 |
| 5,558,173 A | | 9/1996 | Sherman |
| 6,834,739 B2 | * | 12/2004 | Iyoda et al. .................. 180/282 |
| 2008/0135325 A1 | | 6/2008 | Stuhldreher et al. |

* cited by examiner

*Primary Examiner* — Pamela Rodriguez

(57) ABSTRACT

An electric motor system that triggers brake and steering function upon engine failure featuring an electric motor; and a vacuum pump, an oil pump, and a sensor each operatively connected to the electric motor. The vacuum pump is connected to the vehicle's brake servo and the oil pump is connected to an oil reservoir and to the vehicle's steering sector. The sensor is adapted to detect when the engine is turned off. When the engine is turned off the sensor is activated and causes activation of the electric motor. Activation of the electric motor causes activation of the vacuum pump and the oil pump. The vacuum pump functions to provide a vacuum in the servo brake of the vehicle and the oil pump functions to create oil pressure with oil in the oil reservoir and direct oil pressure to the steering sector.

5 Claims, 3 Drawing Sheets

MOTOR SYSTEM FOR TRIGGERING BRAKE AND STEERING CONTROL DURING ENGINE FAILURE

FIELD OF THE INVENTION

The present invention is directed to an electric motor device designed to trigger brake and steering control during engine failure.

BACKGROUND OF THE INVENTION

When a vehicle engine shuts off, the steering wheel typically hardens, making it hard to steer the vehicle to the side of the road to avoid an accident. Accidents often occur because of this, some of which may be fatal. The present invention features a motor system for triggering brake and steering control. For example, if the engine of the vehicle shuts off, a driver can easily handle the car and have full use of the brake before having to pull to the side of the road. The system of the present invention can help prevent accidents.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY

The present invention features a motor system for triggering brake and steering control when the engine fails. In some embodiments, the system comprises an electric motor, the electric motor comprises wiring adapted to operatively connect the electric motor to a battery of a vehicle; a vacuum pump operatively connected to the electric motor, the vacuum pump is operatively connected to a brake servo of the vehicle via a hose; an oil pump operatively connected to the electric motor, the oil pump is fluidly connected to an oil reservoir and to a steering sector of the vehicle; and a sensor operatively connected to the electric motor, the sensor is adapted to detect when an engine of the vehicle is turned off, wherein when the engine of the vehicle is turned off the sensor is activated and sends a signal to the electric motor causing activation of the electric motor. Activation of the electric motor causes activation of the vacuum pump and the oil pump, the vacuum pump functions to provide a vacuum in the servo brake of the vehicle and the oil pump functions to create oil pressure with oil in the oil reservoir and direct oil pressure to the steering sector.

In some embodiments, the sensor is adapted to detect a drop in oil pressure. In some embodiments, the sensor is operatively connected to an oil pressure conduit. In some embodiments, the system further comprises a first valve positioned between the servo brake of the vehicle and a multiple admission of the vehicle, a second valve positioned between a power steering pump of the vehicle and the steering sector of the vehicle, a third valve positioned between the servo brake of the vehicle and the electric motor, and a fourth valve positioned between the oil reservoir and the steering sector of the vehicle. In some embodiments, when the engine of the vehicle is off the first valve and the second valve are closed and the third valve and the fourth valve are opened, wherein the third valve allows a vacuum to be created in the brake servo via the electric motor and the vacuum pump and the fourth valve allows pressure to be provided from the oil reservoir and oil pump to the steering sector of the vehicle.

BRIEF DESCRIPTION OF THE DRAWINGS

FIG. 3 is a schematic view of the components of the system of the present invention in combination with components of a standard vehicle engine when the engine is on.

DESCRIPTION OF PREFERRED EMBODIMENTS

Figure 1:
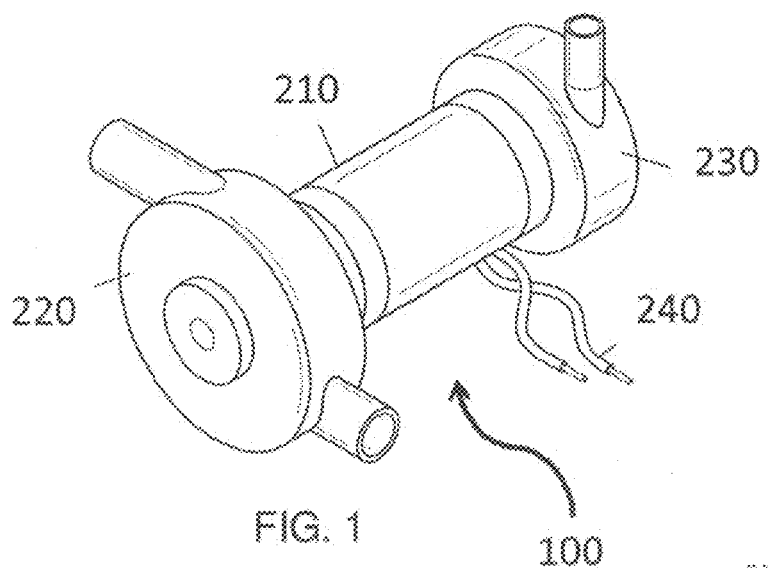
FIG. 1 is a perspective view of the system of the present invention.

Typically, when a vehicle's engine 101 is turned on, a vacuum is created in the brake servo 120 via the multiple admission 110. The vacuum allows the brakes 122 of the vehicle to be used without much force. Also, when the engine 101 is on, the engine 101 causes movement of the power steering pump 130, which creates hydraulic pressure allowing the steering sector 140 turn with ease. However, when the engine 101 is turned off (or shuts off due to a problem with the vehicle), the vacuum is no longer present in the servo brake 120 and the power steering pump 130 is deactivated, making the brakes and steering wheel of the vehicle difficult to use.

Referring now to FIG. 1-4, the present invention features an electric motor system 100 for triggering brake and steering control in the event of engine failure. The system 100 of the present invention comprises an electric motor 210. The electric motor 210 comprises wiring 240 adapted to operatively connect the electric motor 210 to the battery of the vehicle. The electric motor 210 is operatively connected to a vacuum pump 220 and to an oil pump 230.

Figure 2:
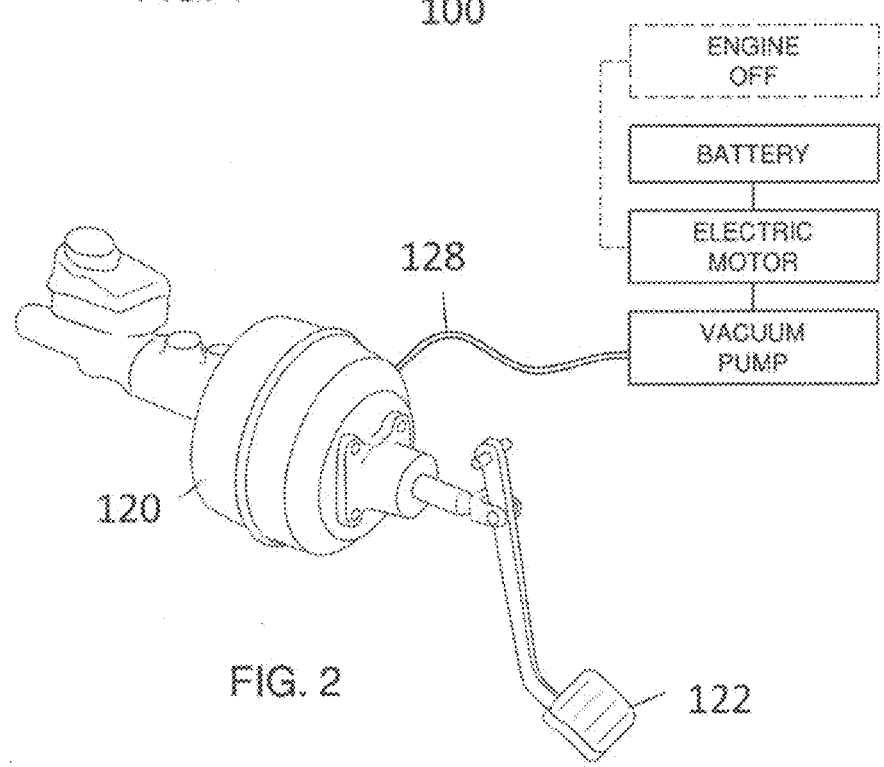
FIG. 2 is a perspective view of the brake servo connected to the system of the present invention via a hose.
Figure 3:
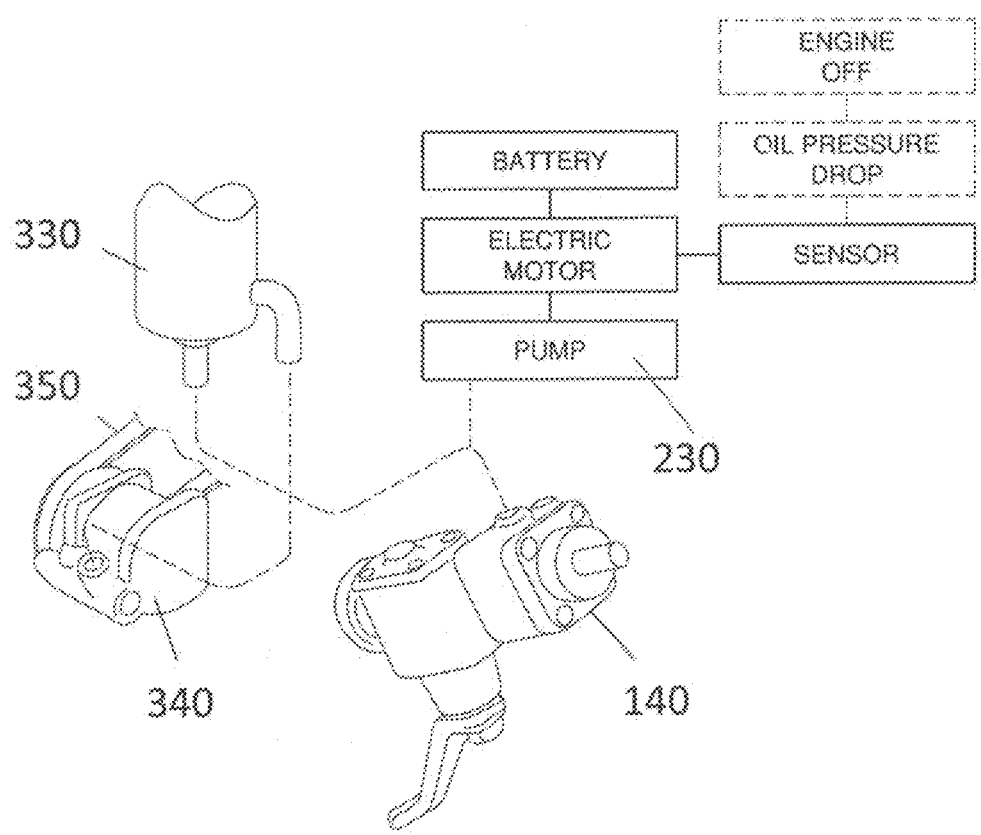
Figure 4:
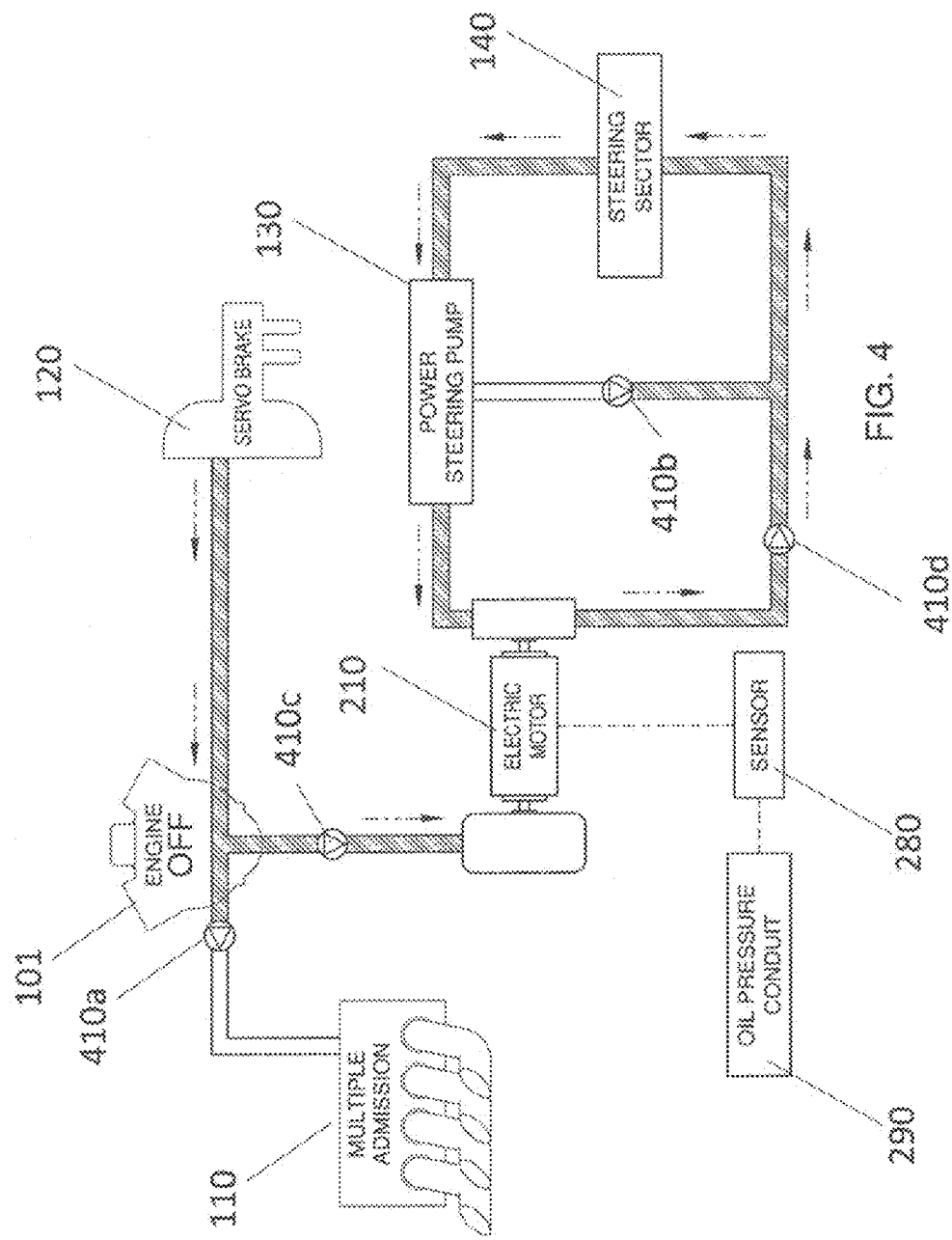
FIG. 4 is a schematic view of the components of the system of the present invention in combination with components of a standard vehicle engine when the engine is off.

As shown in FIG. 2, the vacuum pump 220 is operatively connected to the brake servo 120 via a hose 128. As shown in FIG. 3, the oil pump 230 is operatively (and/or fluidly) connected to the steering sector 140 and to an oil reservoir 330. The oil reservoir 330 is fluidly connected to the steering pump 340 (the steering pump 340 being engaged with the engine via a belt 350).

The system 100 of the present invention further comprises a sensor 280 operatively connected to the electric motor 210 (e.g., via a microprocessor). The sensor is adapted to detect when the engine is turned off. Such sensors are well known to one of ordinary skill in the art. In some embodiments, the sensor 280 detects a drop in oil pressure (e.g., the sensor 280 is operatively connected to an oil pressure conduit 290). However, the sensor 280 is not limited to this mechanism. In some embodiments, the sensor 280 is operatively connected to the multiple admission 110.

When the engine is turned off, the sensor 280 is activated and sends a signal to the electric motor 210 to activate the electric motor 210 (or the sensor 280 sends a first sensor input signal to the microprocessor whereupon the microprocessor sends a first output command to the electric motor 210 to cause activation of the electric motor 210).

Activation of the electric motor 210 causes activation of the vacuum pump 220 and the oil pump 230 (e.g., with oil reservoir 330). The vacuum pump 220 functions to maintain a vacuum in the servo brake 120 such that the brake can be manipulated easily by a driver. The electric motor 210 causes the oil pump 230 to create oil pressure with the oil in the oil reservoir 330. The oil pressure maintains the pressure needed in the steering sector 140, allowing the steering wheel to move freely as needed.

A first valve 410a is positioned between the servo brake 120 and the multiple admission 110. A second valve 410b is positioned between the power steering pump 130 and the steering sector 140. A third valve 410c is positioned between the servo brake 120 and electric motor 210. A fourth valve 410d is positioned between the oil reservoir 330 and the steering sector 140. The valves 410 are biased in the closed position and open depending on the direction of the oil pressure. When the engine 101 is on, the first valve 410a and the second valve 410b are open and the third valve 410c and the fourth valve 410d are closed. The first valve 410a allows a vacuum to be created in the brake servo 120 via the multiple admission 110. The second valve 410b opens because the power steering pump 130 provides pressure to the steering sector 140. When the engine 101 is off, the first valve 410a and the second valve 410b are closed and the third valve 410c and the fourth valve 410d are opened. The third valve 410c allows a vacuum to be created in the brake servo 120 via electric motor 210 and vacuum pump. The fourth valve 410d allows pressure to be provided from the oil reserve 330 to the steering sector 140.

The disclosures of the following U.S. Patents are incorporated in their entirety by reference herein: U.S. Pat. No. 3,954,147; U.S. Pat. Application No. 2008/0135325; U.S. Pat. No. 5,505,276; U.S. Pat. No. 5,558,173; U.S. Pat. No. 3,847,243; U.S. Pat. No. 3,820,620; U.S. Pat. No. 3,762,492.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. An electric motor system comprising:
    (a) an engine (101) of a vehicle, wherein the engine (101) comprises a steering pump (130) having an oil reservoir (330), wherein the steering pump (130) is powered by the engine (101) via a belt (350);
    (b) an electric motor (210), the electric motor (210) comprises wiring (240) adapted to operatively connect the electric motor (210) to a battery of the vehicle;
    (c) a vacuum pump (220) operatively connected to the electric motor, the vacuum pump (220) is operatively connected to a brake servo (120) of the vehicle via a hose (128);
    (d) an oil pump (230) operatively connected to the electric motor, the oil pump (230) is fluidly connected to the oil reservoir (330) and to a steering sector (140) of the vehicle; and
    (e) a sensor (280) operatively connected to the electric motor (210), the sensor (280) is adapted to detect when the engine (101) of the vehicle is turned off, wherein when the engine (101) of the vehicle is turned off the sensor (280) is activated and sends a signal to the electric motor (210) causing activation of the electric motor (210);

wherein activation of the electric motor (210) causes activation of the vacuum pump (220) and the oil pump (230), the vacuum pump (220) functions to provide a vacuum in the servo brake (120) of the vehicle and the oil pump (230) functions to create oil pressure with oil in the oil reservoir and direct oil pressure to the steering sector (140).

2. The electric motor system of claim 1, wherein the sensor (280) is adapted to detect a drop in oil pressure.

3. The electric motor system of claim 2, wherein the sensor (280) is operatively connected to an oil pressure conduit (290).

4. The electric motor system of claim 1 further comprising a first valve (410a) positioned between the servo brake (120) of the vehicle and a multiple admission (110) of the vehicle, a second valve (410b) positioned between a power steering pump (130) of the vehicle and the steering sector (140) of the vehicle, a third valve (410c) positioned between the servo brake (120) of the vehicle and the electric motor (210), and a fourth valve (410d) positioned between the oil reservoir (330) and the steering sector (140) of the vehicle, wherein when the engine (101) of the vehicle is off the first valve (410a) and the second valve (410b) are closed and the third valve (410c) and the fourth valve (410d) are opened, the third valve (410c) allows a vacuum to be created in the brake servo (120) via the electric motor (210) and the vacuum pump (220) and the fourth valve (410d) allows pressure to be provided from the oil reservoir (330) and oil pump (230) to the steering sector (140) of the vehicle.

5. An electric motor system consisting of:
    (a) an engine (101) of a vehicle, wherein the engine (101) consists of a steering pump (130) having an oil reservoir (330), wherein the steering pump (130) is powered by the engine (101) via a belt (350);
    (b) an electric motor (210), the electric motor (210) consists of wiring (240) to operatively connect the electric motor (210) to a battery of the vehicle;
    (c) a vacuum pump (220) operatively connected to the electric motor, the vacuum pump (220) is operatively connected to a brake servo (120) of the vehicle via a hose (128);
    (d) an oil pump (230) operatively connected to the electric motor, the oil pump (230) is fluidly connected to the oil reservoir (330) and to a steering sector (140) of the vehicle; and
    (e) a sensor (280) operatively connected to the electric motor (210), the sensor (280) is adapted to detect when the engine (101) of the vehicle is turned off, wherein when the engine (101) of the vehicle is turned off the sensor (280) is activated and sends a signal to the electric motor (210) causing activation of the electric motor (210);

wherein activation of the electric motor (210) causes activation of the vacuum pump (220) and the oil pump (230), the vacuum pump (220) functions to provide a vacuum in the servo brake (120) of the vehicle and the oil pump (230) functions to create oil pressure with oil in the oil reservoir and direct oil pressure to the steering sector (140).

* * * * *